United States Patent
Leven

(10) Patent No.: US 6,798,557 B1
(45) Date of Patent: Sep. 28, 2004

(54) DIRECT OPTICAL N-STATE PHASE SHIFT KEYING

(75) Inventor: Andreas Leven, Long Hill Township, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 10/443,328

(22) Filed: May 22, 2003

(51) Int. Cl.[7] ................................. G02F 1/01
(52) U.S. Cl. ...................... 359/279; 359/181; 359/183
(58) Field of Search .................. 359/279, 181, 359/183, 154, 161, 173, 286, 156

(56) References Cited

U.S. PATENT DOCUMENTS

| | | | |
|---|---|---|---|
| 6,594,055 B2 * | 7/2003 | Snawerdt | 398/141 |
| 2003/0058504 A1 * | 3/2003 | Cho et al. | 359/161 |
| 2003/0133174 A1 * | 7/2003 | Salehi et al. | 359/15 |

OTHER PUBLICATIONS

A.H. Gnauck, et al "2.4 Tb/s (64×42.7 Gb/s) Transmission Over 40×100 km NZDSF Using RZ–DPSK Format and All–Raman–Amplified Spans", 3 pages, Mar. 2002, *OFC 2002*.

R. A. Griffin et al., "10 Gb/s Optical Differential Quadrature Phase Shift Key (DQPSK) Transmission Using GaAs/AlGaAs Integration" 3 pages, Mar. 2002, *OFC 2002*.

* cited by examiner

*Primary Examiner*—Ricky Mack
*Assistant Examiner*—Brandi N Thomas

(57) ABSTRACT

A unique optical encoder is employed that utilizes an optical phase modulator, in which an arbitrary phase shift can be realized. The phase modulator is driven by an electrical signal, where the voltage amplitude is proportional to a desired arbitrary phase shift. However, any amplitude noise or poor rise and fall times of the driving voltage translates directly into phase errors. These problems are eliminated by employing a digital phase switch. One encoder, in accordance with the invention, employs an optical phase modulator that can switch the optical phase in a binary manner, wherein the two phase states of the modulator can be chosen to differ by any desired arbitrary angle depending on the splitting ratio of the optical signal to be modulated.

20 Claims, 2 Drawing Sheets

DIRECT OPTICAL N-STATE PHASE SHIFT KEYING

TECHNICAL FIELD

This invention relates to optical transmission systems and, more particularly, to phase shift keying of optical signals.

BACKGROUND OF THE INVENTION

Recently, there has been growing interest in alternate optical modulation formats for use in high bit-rate optical communications systems. To this end, optical differential phase shift keying (ODPSK) is a promising candidate to increase system capacity, reach and spectral efficiency. However, up to now only optical differential binary phase shift keying (ODBPSK), as described in an article entitled "2.5 Tb/s (64×42.7 Gb/s) Transmission Over 40×100 km NZDSF Using RZ-DPSK Format and All-Raman-Amplified Spans", by A. H. Gnauk et al., OFC 2002, and optical differential quadrature phase shift keying (ODQPSK), as described in an article entitled "10 Gb/s Optical Differential Quadrature Phase Shift Key (DQPSK) Transmission Using GaAs/AlGaAs Integration", by R. A. Griffin et al., OFC 2002, have been successfully demonstrated at higher bit-rates.

In these systems, there is a need for an improved optical encoder. Indeed, one problem that has not been addressed is that prior OPSK arrangements could only perform a phase shift related directly to $\pi$, and at best could only realize a phase shift of $\pi/2$.

SUMMARY OF THE INVENTION

These and other problems and limitations of prior known optical PSK optical transmission arrangements are overcome by employing a unique optical encoder that utilizes an optical phase modulator, in which an arbitrary phase shift can be realized. The phase modulator is driven by an electrical signal, where the voltage amplitude is proportional to a desired arbitrary phase shift. However, any amplitude noise or poor rise and fall times of the driving voltage translates directly into phase errors. These problems are eliminated by employing a digital phase switch.

One encoder, in accordance with the invention, employs an optical phase modulator that can switch the optical phase in a binary manner, wherein the two phase states of the modulator can be chosen to differ by any desired arbitrary angle depending on the splitting ratio of the optical signal to be modulated.

Specifically, applicant's unique encoder invention is employed in PSK systems that implement optical N-state phase shift keying, for example, where N=4, 8, 16, . . . . These systems typically include a serial array of encoders each including a $\log_2 N$ optical binary phase shift modulator. Each of the optical modulators produces a binary phase shift modulated optical signal. The two output states of a modulator (e.g., binary +1 and −1) have a phase shift different than $\pi$. In preferred embodiments, the phase shift is $\pi/N$ for the two output states of one of the modulators in an encoder in the serial array.

DETAILED DESCRIPTION

Figure 1:
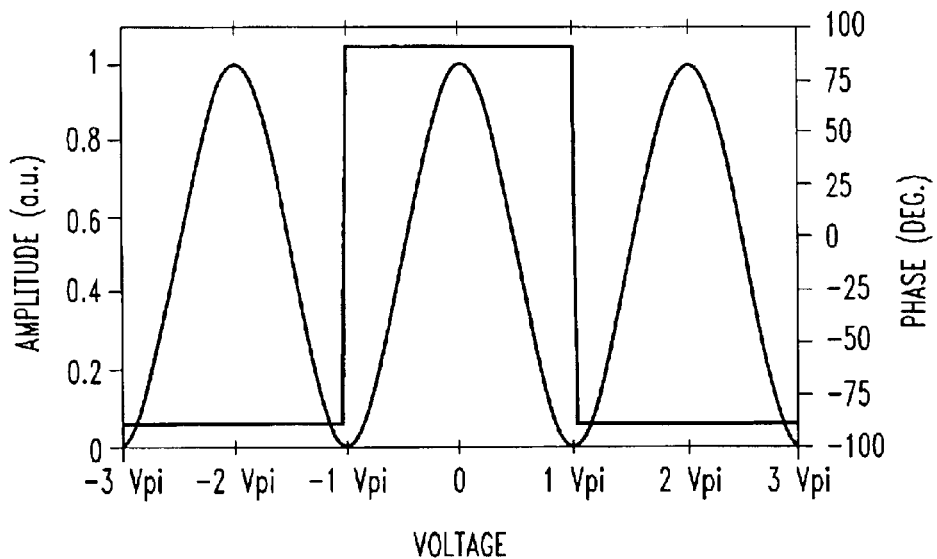
FIG. 1 graphically illustrates an amplitude and phase response of a Mach-Zehnder modulator (MZM) useful in describing the invention.

FIG. 1 shows graphical, representations of an amplitude transfer function and a phase response of an optical modulator, e.g., a Mach-Zehnder optical modulator (MZM). It is noted that the phase response has a digital characteristic. If the median driving voltage $V_D$ to the optical modulator, e.g., supplied via input 209 to MZM 203 shown in FIG. 2, is selected to be at a minimum of the amplitude transfer function, the phase of a supplied optical signal is modulated in a binary fashion, and therefore, has two phase states.

Figure 2:
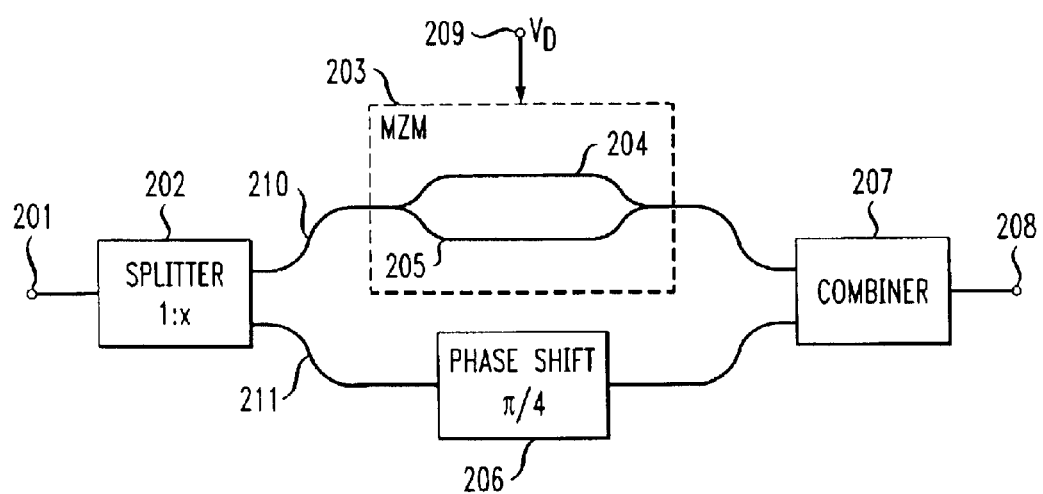
FIG. 2 shows, in simplified block diagram form, an encoder including one embodiment of the invention.

To transmit higher bit per word counts than the prior known arrangements, including those noted above in the background, I propose an encoder including an optical modulator as shown in FIG. 2. This unique encoder is used to switch the optical phase in a binary fashion, but the two-phase states can be selected to differ by any desired angle. Thus, as shown in FIG. 2, coherent light is supplied via input 201 to optical 1:x power splitter 202, which can have a variable or a fixed splitting ratio. In one example, an optical 1:2 power splitter is utilized. One portion of the split coherent light signal is supplied via branch 210 to Mach-Zehnder modulator (MZM) 203 and, therein, to waveguides 204 and 205. A driving voltage $V_D$ is supplied to another input of MZM 203. An optical modulated output from MZM 203 is supplied to one input of power combiner 207. The other portion of the split coherent light is supplied via branch 211 to optical phase shifter 206, which in this example supplies a phase shift of $\pi/4$. The phase shifted output from phase shifter 206 is supplied to a second input of power combiner 207. Consequently, the optical outputs from MZM 203 and phase shifter 206 are combined in power combiner 207 and supplied as an output at output terminal 208. From practice, MZM 203 is driven by a high speed digital signal $V_D$ supplied via input 209. The high speed digital signal has a median voltage at a minimum of the amplitude transfer function of MZM 203, as described above. This results in a binary phase shift keyed (BPSK) signal at the output of MZM 203 in branch 210. When this signal is combined with the signal from branch 211 including phase shifter 206, a binary phase coded signal results, where the phase difference, $\Delta\phi$, between the two optical modulator states depends on the power ratio $P_1/P_2$ of the signals in both branches 210 and 211, namely:

$$\Delta\varphi = 2\arctan\frac{P_1}{P_2}.$$

It is again noted that prior arrangements employing a Mach-Zehnder modulator could only realize a phase difference of $\pi$, and at best $\pi/2$, between the two output states.

Figure 3:
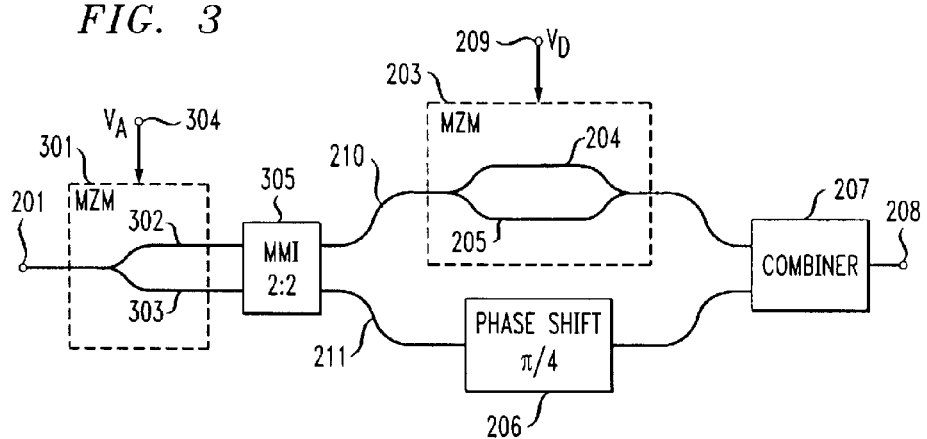
FIG. 3 illustrates, in simplified block diagram form, another encoder utilizing the principles of the invention.

FIG. 3 illustrates, in simplified block diagram form, another encoder utilizing the principles of the invention. Elements of the encoder shown in FIG. 3 that are essentially identical in operation and structure to those shown in FIG. 2 have been similarly numbered and will not be discussed again in detail. The difference between the embodiment shown in FIG. 3 and the embodiment shown in FIG. 2 lies in how the incoming coherent optical signal is split into the two branches 210 and 211. As shown, the incoming coherent optical signal is supplied to an input of MZM 301 wherein it is supplied to branches 302 and 303. In this example, MZM 301 is a low frequency MZM. The two outputs from MZM 301 are supplied to the inputs of multimode interference coupler (MMI) 305, which in this example; is a 2:2 MMI. The splitting ratio and, subsequently, the phase difference of the binary states of the encoder are set by voltage $V_A$ applied to input 304 of MZM 301.

Figure 4:
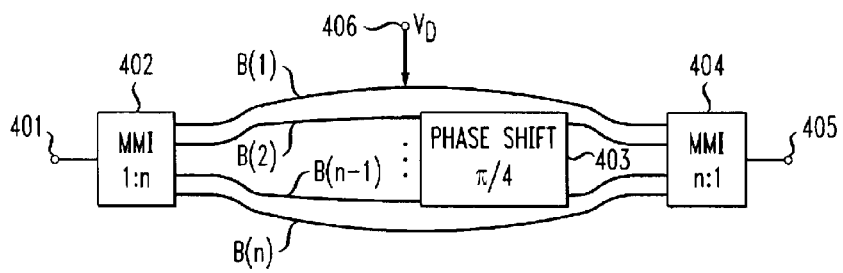
FIG. 4 depicts, in simplified block diagram form, still another encoder utilizing the principles of the invention.

FIG. 4 depicts, in simplified block diagram form, still another encoder utilizing the principles of the invention. A coherent optical signal is supplied via input 401 to optical splitter 402, which in this example is a 1:n MMI coupler. MMI supplies n branches as outputs, namely, branches B(1), B(2), . . . B(n-1) and B(n). In this example, branches B(1) and B(n) form a Mach-Zehnder modulator, i.e., MZM, while branches B(2) through B(n-1) are supplied to optical phase shifter 403 where they receive, in this example, a phase shift of $\pi/4$. All of the branches 1 through n are supplied to inputs of power combiner 404, which in this example is a n:1 MMI. The combined optical signal is supplied as an output at 405.

If all branches of the embodiment shown in FIG. 4 receive the same power, it is equivalent to the embodiment of FIG. 3, but having a fixed splitting ratio of 2:(n-2). The resulting phase difference can be calculated by employing the equation described above. For example, choosing four branches will result in a phase difference of $\pi/2$, and choosing seven branches will result in a phase difference of $\pi/4$ with an error of 1.4 degree. Such small errors can readily be compensated by slightly increasing the loss in a set of branches, for example, by intentionally misaligning some of the branches relative to the MMI 404.

Figure 5:
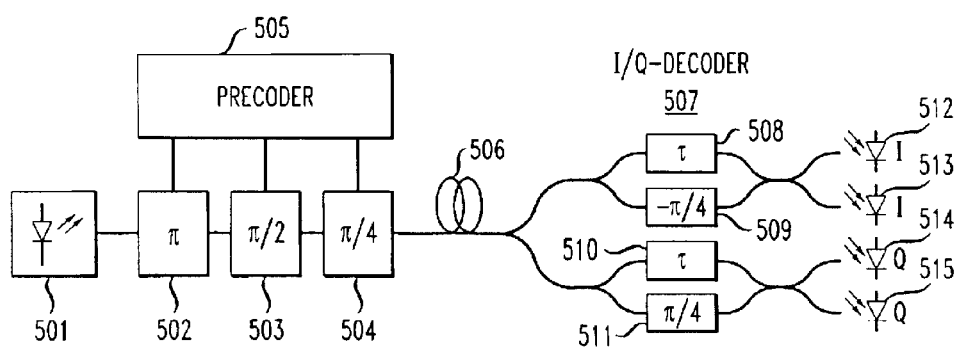
FIG. 5 shows, in simplified block diagram form, a system utilizing a plurality of encoders each employing the principles of the invention.

FIG. 5 shows, in simplified block diagram form, a system utilizing a plurality of encoders in a serial array, each encoder employing the principles of the invention. A coherent optical signal is generated by light source 501 and supplied to the serial array of binary phase encoders 502, 503 and 504. Data to be transmitted is precoded in precoder 505 to accommodate for the differential transmission and is then supplied to the binary phase encoders 502, 503 and 504. In this example, binary phase encoder 502 has a phase difference of $\pi$, binary phase encoder 503 has a phase difference of $\pi/2$ and binary phase encoder 504 has a phase difference of $\pi/4$. Therefore, the resulting optical signal is 8PSK-coded, with 3 bits per symbol. The modulated optical signal is transmitted via optical transmission media 506 to a remote receiver including optical demodulator 507. In this example, optical demodulator 507 is a differential in-phase—quadrature phase (I/Q) optical demodulator. Demodulator 507 includes two sets of branches, one set including delay $\tau$ 508 in one branch and phase shifter 509 for supplying a phase difference of $-\pi/4$ in the other branch, and the other set also including delay $\tau$ 510 in one branch and phase shifter 511 for supplying a phase difference of $\pi/4$ in the other branch. The optical signals from the branches in the first set are supplied to optical detectors 512 and 513 and represent the in-phase components I and $\bar{I}$. Similarly, the optical signals from the branches in the other set are supplied to optical detectors 514 and 515 and represent the in-phase components Q and $\bar{Q}$. The delay $\tau$ of the differential I/Q demodulator 507 is equivalent to the symbol rate of the transmitted optical signal.

What is claimed is:

1. An optical encoder comprising:
    an optical signal splitter having an input and at least two outputs, the optical splitter being configured to split a continuous wave optical signal supplied to the input of the splitter into mutually coherent at least first and second continuous wave optical signals at said at least first and second outputs, respectively, of the splitter;
    an optical signal combiner having at least first and second inputs and an output being configured to combine at least first and second mutually coherent optical signals supplied to said at least first and second optical combiner inputs to yield a combined phase modulated optical signal at the combiner output, in said optical combiner, said at least first and second mutually coherent optical signals being overlapping and interfering with each other;
    an optical phase shifter having a predetermined fixed phase shift coupled in one optical path between said at least second output of the optical splitter and said at least second input to the optical combiner; and
    a first optical phase modulator coupled in another optical path between a first output of the optical splitter and said at least first input of the optical combiner, the first optical phase modulator being configured to be responsive to bits of a prescribed driving digital signal so that the phase of the supplied optical signal is modulated in binary fashion and has at least two phase states,
    wherein a binary phase coded optical signal results at the optical combiner output.

2. The optical encoder as defined in claim 1 wherein said first optical phase modulator has a voltage amplitude transfer function and said prescribed driving signal is a binary signal having a median voltage value substantially at a minimum of said voltage amplitude transfer function, wherein a binary phase shift keyed optical signal results at an output of the first optical phase modulator.

3. The optical encoder as defined in claim 2 wherein said first optical phase modulator is a Mach-Zehnder modulator.

4. The optical encoder as defined in claim 3 wherein the phase shift of the phase shifter is $\pi/4$.

5. The optical encoder as defined in claim 1 wherein the phase difference, $\Delta\phi$, between the first optical phase modulator output states is determined by the power ratio $P_1/P_2$ of the power, $P_1$, at an output of the optical modulator and of the power, $P_2$, at an output of the phase shifter.

6. The optical encoder as defined in claim 5 where the phase difference is determined in accordance with $$\Delta\varphi = 2\arctan\frac{P_1}{P_2}.$$

7. The optical encoder as defined in claim 1 wherein said optical splitter includes a second optical phase modulator having two branches to which an incoming coherent optical signal is supplied, the second optical phase modulator being driven by a second driving signal, the two branches being individually coupled inputs of a multimode interference coupler (MMI), wherein the phase difference between the two binary states of the encoder is set by said second driving signal.

8. The optical encoder as defined in claim 7 wherein said MMI is a 2:2 MMI having two inputs and two outputs, a first output of said MMI coupled to the input of said first optical phase modulator and said second output of said MMI coupled to the input of said phase shifter.

9. The optical encoder as defined in claim 8 wherein said second optical modulator is a Mach-Zehnder modulator.

10. The optical encoder as defined in claim 1 wherein said optical splitter includes a first multimode interference coupler (MMI) having an input and a plurality of outputs, which are coupled on a one-to-one basis to a plurality of optical paths two of said optical paths forming said first phase modulator and the remaining of said optical paths being coupled to said phase shifter and said optical combiner includes a second multimode interference coupler (MMI) having a plurality of inputs and an output, outputs from said first optical phase modulator being coupled on a one-to-one basis to inputs of said second MMI and outputs of said phase shifter being coupled on a one-to-one basis to others of said inputs of said second MMI.

11. An optical encoding system comprising:

a plurality of optical encoders connected in series;

a coherent optical signal being coupled to an input of a first optical encoder, an output from said first optical encoder being coupled to an input of at least a second optical encoder, an output from said at least second optical encoder yielding a binary phase coded optical signal, each of said plurality of optical encoders including an optical signal splitter having an input and at least first and second outputs, the optical splitter being configured to split a continuous wave optical signal supplied to the input of the splitter into mutually coherent at least first and second continuous wave optical signals at said at least first and second outputs, respectively, of the splitter;

an optical signal combiner having at least first and second inputs and an output being configured to combine at least first and second mutually coherent optical signals supplied to said at least first and second optical combiner inputs to yield a combined phase modulated optical signal at the combiner output, in said optical combiner, said at least first and second mutually coherent optical signals being overlapping and interfering with each other;

an optical phase shifter having a predetermined fixed phase shift coupled in one optical path between said at least second output of the optical splitter and said at least second input to the optical combiner; and a first optical phase modulator coupled in another optical path between said first output of the optical splitter and said at least first input of the optical combiner, the first optical phase modulator being configured to be responsive to bits of a prescribed digital driving signal so that the phase of the supplied optical signal is modulated in binary fashion and has two phase states, wherein a binary phase coded optical signal results at the optical combiner output, wherein each phase shifter of each of said plurality optical encoders provides a difference phase shift relative to the others of said phase shifters of said plurality of optical encoders.

12. The optical encoder system as defined in claim 11 further including a precoder for preceding the individual driving signals to be supplied to said plurality of optical encoders.

13. The optical encoder system as defined in claim 11 wherein said first optical phase modulator in each of said plurality of encoders has a voltage amplitude transfer function and said prescribed driving signal for each of said plurality of optical encoders is a binary signal having a median voltage value substantially at a minimum of said voltage amplitude transfer function, wherein a binary phase shift keyed optical signal results at an output of each of the first optical phase modulator.

14. The optical encoder system as defined in claim 13 wherein said first optical phase modulator in each of said plurality of optical encoders is a Mach-Zehnder modulator.

15. A method of optically encoding optical signals comprising:

optically splitting an incoming continuous wave coherent optical signal into mutually coherent at least first and second continuous wave optical signals of said coherent optical signal;

optically combining at least first and second supplied mutually coherent optical signals to yield a combined phase modulated optical signal, in said step of optically combining, said at least first and second mutually coherent optical signals being overlapping and interfering with each other;

optically phase shifting one of said mutually coherent first and second continuous wave optical signals by a predetermined fixed phase shift; and optically phase modulating another of said mutually coherent first and second continuous wave optical signals in response to bits of a prescribed digital driving signal so that the phase of the supplied mutually coherent portion optical is modulated in binary fashion and has two phase states, wherein a binary phase coded optical signal results as a result of the optically combining.

16. The method as defined in claim 15 wherein said prescribed driving signal for said optically modulating is a binary signal having a median voltage value substantially at a minimum of a voltage amplitude transfer function of said optical modulating, wherein a binary phase shift keyed optical signal is a result of said optical combining.

17. The method as defined in claim 16 wherein said optically modulating is realized by employing a Mach-Zehnder modulator.

18. The method as defined in claim 17 wherein the phase shift of the phase shifting is π/4.

19. The method as defined in claim 15 wherein the phase difference, Δφ, between the output states optically phase modulating is determined by the power ratio $P_1/P_2$ of the power, $P_1$, at an output optical signal resulting from of the optically modulating and of the power, $P_2$, at an optical signal resulting as a result of the phase shifting.

20. The method as defined in claim 19 where the phase difference is determined in accordance with $$\Delta\varphi = 2\arctan\frac{P_1}{P_2}.$$

* * * * *

UNITED STATES PATENT AND TRADEMARK OFFICE
CERTIFICATE OF CORRECTION

| | | |
|---|---|---|
| PATENT NO. | : 6,798,557 B1 | Page 1 of 1 |
| APPLICATION NO. | : 10/443328 | |
| DATED | : September 28, 2004 | |
| INVENTOR(S) | : Andreas Leven | |

It is certified that error appears in the above-identified patent and that said Letters Patent is hereby corrected as shown below:

Specification

Column 1, line 8

The following line regarding US government funding should appear between the Title of the Invention and the Technical Field:

"This invention was made with government support under contract number MDA972-02-C-0046 awarded by the Defense Advanced Research Projects Agency (DARPA). The government has certain rights in the invention."

Signed and Sealed this
Twelfth Day of January, 2016

Michelle K. Lee
*Director of the United States Patent and Trademark Office*